Feb. 14, 1956

T. W. WINSTEAD 2,734,224

EXTRUSION APPARATUS

Filed April 6, 1953

INVENTOR
THOMAS W. WINSTEAD

BY *Semmes & Semmes*
ATTORNEYS

Feb. 14, 1956 T. W. WINSTEAD 2,734,224
EXTRUSION APPARATUS
Filed April 6, 1953 2 Sheets-Sheet 2

INVENTOR
THOMAS W. WINSTEAD

BY *Semmes & Semmes*
ATTORNEYS

United States Patent Office 2,734,224
Patented Feb. 14, 1956

2,734,224

EXTRUSION APPARATUS

Thomas W. Winstead, Baltimore, Md., assignor to Hedwin Corporation, Baltimore, Md., a corporation of Maryland Application April 6, 1953, Serial No. 347,117

13 Claims. (Cl. 18—12)

This invention relates generally to extrusion of films and sheeting of plastic material. More particularly, the invention pertains to a new and improved film extrusion die for the continuous extrusion of plastics to form sheets.

Heretofore, considerable difficulty has been encountered particularly in the extrusion of wide sheets of films for the reason that the plastic material would not spread out uniformly from a central point, to the width required because of the lack of a uniform pressure throughout the extruding die.

Accordingly, an object of the present invention is to provide an extrusion die overcoming the failures of prior known devices and which will be highly effective in operation and at the same time inexpensive and comparatively simple to manufacture and maintain.

Additionally, as an object of the present invention, the die must be constructed to minimize stress problems arising during the extrusion.

In arriving at the die of the present invention, it has been found necessary to divide the flow of plastic uniformly in multiples of, for example, 2 which provides equal distance of travel for all material entering the die to any point of the die lips. The die is preferably constructed of two flat plates each having a portion of the flow passages therein and the plates are thereafter joined together in superposed position with the flow passage portions coinciding to complete the die structure. In this construction, bolts or other securing means can be used between the various branches of the flow passages at points close to the die lips where maximum stress occurs as well as anywhere else required throughout the die.

A further object of the invention is to provide an extrusion die having flow passages therethrough formed as a substantial tree design and each of the individual passages being completely streamlined whereby all plastics including heat sensitive thermoplastics such as vinyls will flow smoothly and evenly therethrough without clogging or hang-up of the material.

An outstanding advantage of the die of the present invention is that it is feasible to construct such a die which will produce a plastic sheeting of wide sheets in a straight line which heretofore has been impossible. The width of the extruded sheets when using the die of the present invention is substantially unlimited as compared with prior known devices.

Still a further object of the present invention is the use of detachable and interchangeable lips for the die which permits lip openings of variable thickness. This feature of the invention is not essential however since the lips could be made as integral parts of the major plates of the die.

Another object of the invention resides in the streamlining of the plastic passages which provides the possibility of use with rigid or flexible plastics since change in viscosity of a plastic will not effect uniformity of flow and the final product, contrary to known dies which are each individually designed for plastics of a given definite viscosity.

The die of the present invention is also susceptible of simple and quick cleaning, especially for changing colors of plastics used, since no undercuts are necessary as in most dies which take a substantial period of time to clean due to these undercuts and which of necessity must be scraped out by hand.

It is also possible according to the teachings of the present invention to use a breaker plate and screen just ahead of the die lips although this is not essential to the invention.

A basic principle of the present invention resides in the tree die design which in effect breaks down the cross-section of the plastic inlet passage into pairs of branches so that the flow from any one point to the die lips is always of equal distance. This, in conjunction with the use of circular cross-section passages and the streamlining incorporated into the passages, gives the desired and highly improved results which could not be obtained in prior known dies. Manifestly, the number of divisions of the individual passages in proximity to the die lips can be made in multiples other than two. This would be applicable to some plastics but might render the die unable to handle plastics of different viscosities.

Other objects and advantages of the present invention will be apparent from the following detailed description of embodiments of the invention taken together with the accompanying drawings, in which.

Figure 1:
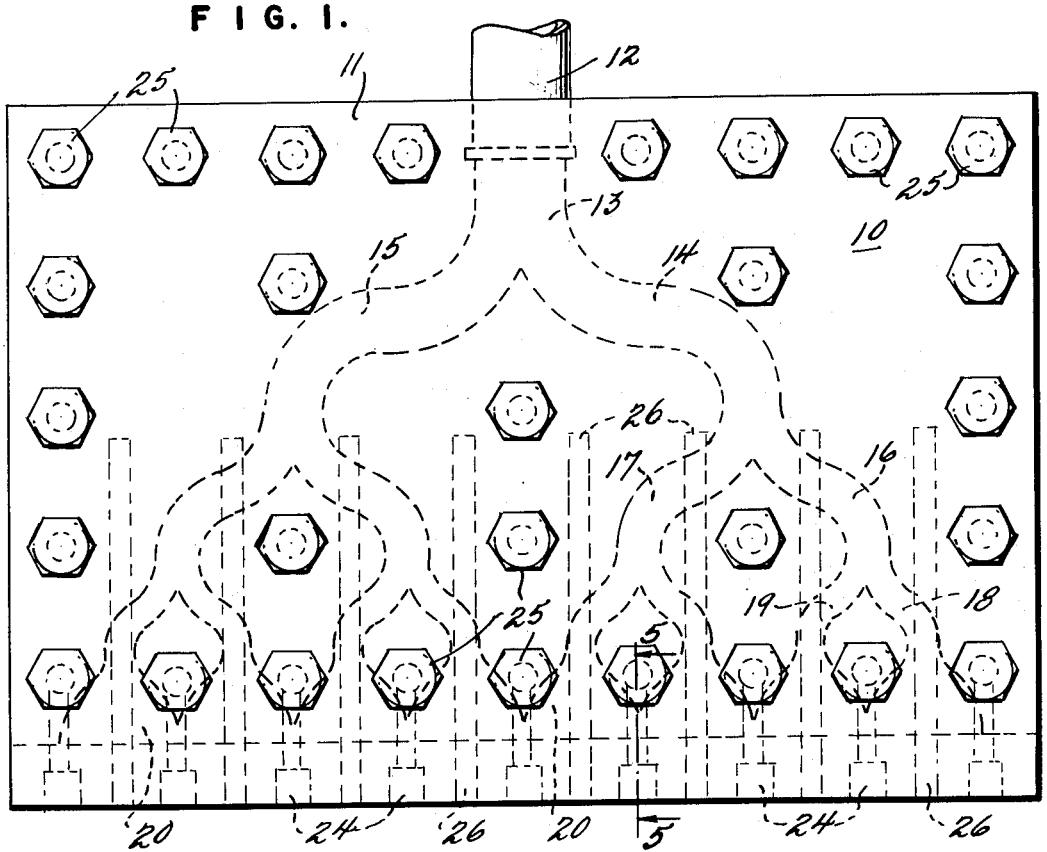
Figure 1 is a plan view of the apapratus of the present invention showing, in dotted lines, plastic flow passages therein.
Figure 2:
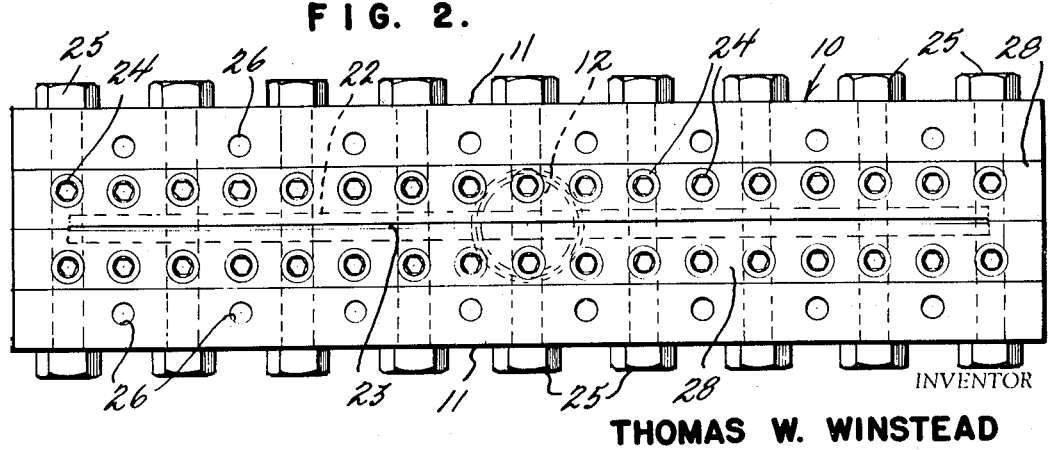
Figure 2 is an end elevational view of the device of Figure 1.
Figure 3:
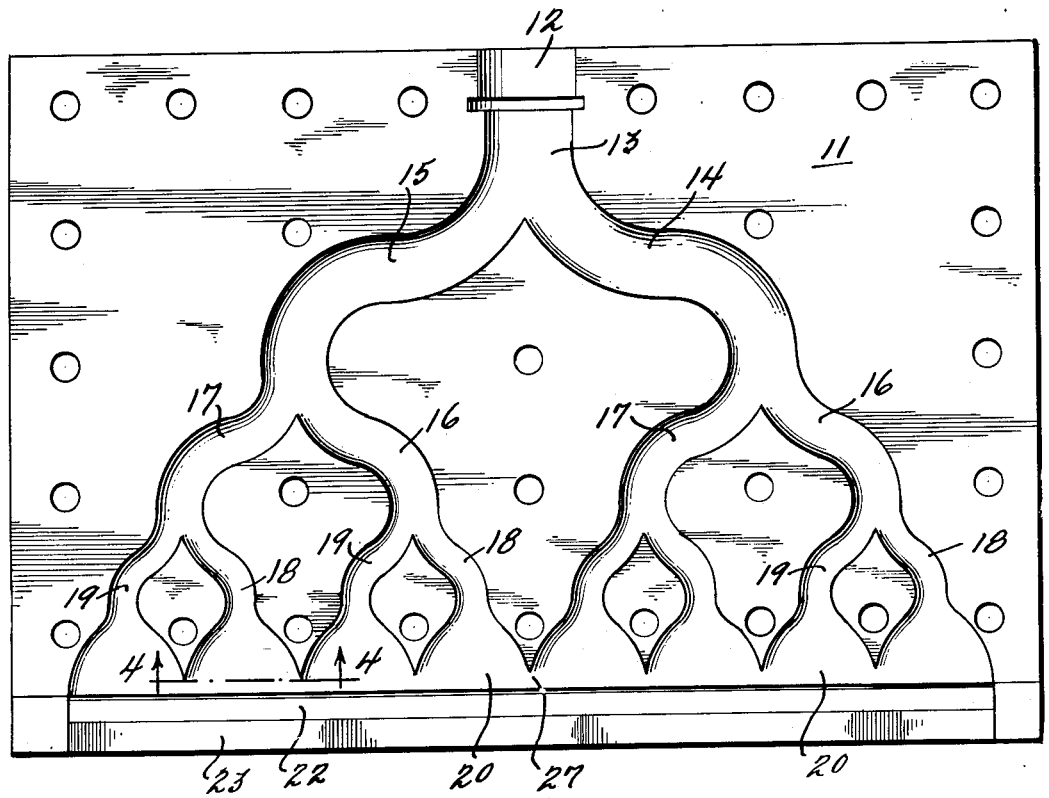
Figure 3 is a plan view of one-half of the die body showing the passageways for plastic therein.

In the drawings, the die is generally designated as 10 and consists of two identical die bodies 11 which are plates having machined therein portions of plastic flow passages. Each half of the die comprises one of the plates 11. A bore 12 is provided for entrance of the plastic to be extruded and which leads into a single main branch 13 of the passages. As shown in Figures 1 and 3, the main channel or passage 13 then is divided into passages 14 and 15. Each of the passages 14 and 15 is then further divided into passages 16 and 17, respectively, which again are further divided into passages 18 and 19. Where these individual passages are divided, streamlining is effected by the material remaining in the die bodies 11 so as to provide continual, smooth passageways in which there is no possibility of a hang up of the plastic material flowing through the passages.

Each of the plates 11 has semi-circular passages formed therein corresponding to those of the other of the plates so that when the two plates are assembled to form the completed die 10, the passages will be circular in cross-section. By forming the passages as a tree design, the plastic mass after entering at 12 will then flow through the various branches and the flow from any one point in the die to the die lips, as will appear hereinafter, is always of equal distance. As can be seen from Figures 1 and 3, the cross-section of the flow is broken down into pairs of branches of increasing number but preferably in multiples of two. The individual passages are streamlined and of a sinuous configuration as also shown in the drawings so that even, smooth, and continuous flow of the plastic material is obtained. Due to this construction, and configuration the flow from any one point to the die lips is always of equal distance and substantially unhindered during its entire passage through the die.

Figure 4:
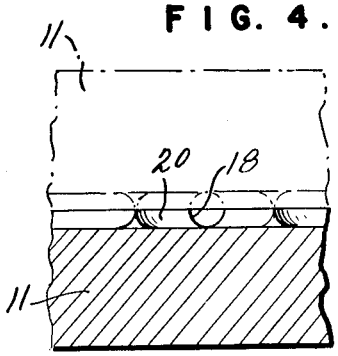
Figure 4 is a partial sectional view taken on the line 4—4 of Figure 3.

The cross-section of the individual passages or channels beyond the last flow channel is substantially rectangular as shown in Figure 4. This substantially rectangular portion is shown at 20 where it merges into the passages 18 or 19. Manifestly, the corner portions of the individual rectangular sections are curved to continue the smooth flow characteristics.

The substantially rectangular portions 20 of the individual passages merge into one another to form a continuous outlet orifice 27 extending across the active area of the die as can be seen in Figure 3. The die bodies or plates 11 at the outer end thereof have rectangular shaped cut-out portions 21 which mate with one another and provide space for insertion of die lips in each half of the die.

Figure 5:
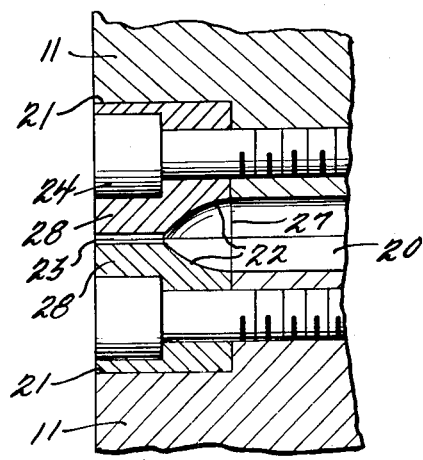
Figure 5 is a partial sectional view taken on the line 5—5 of Figure 1.

The die lips 28 as better shown in Figure 5 each have complemental curved portions 22 cut therefrom which are for coacting with the outer extremity of the orifice 27. Outwardly from the curved portions, each die lip has a partial longitudinal groove 23 which together form the extrusion opening from the die and which extrusion opening extends completely across the active area of the die and is adapted for the continuous flow of plastic from the die in a thin sheet. Each of the die lips 28 is affixed to a corresponding die body 11 by insertion into the rectangular cut-out portion 21 and secured therein by means of bolts 24 and the like which make the die lips readily removable and interchangeable for either cleaning or for a change in size as will be apparent.

The two die bodies or plates 11 after being superposed on one another following the machining of the various semi-circular passages are then drilled or tapped in areas between the various passages in any desired number of places and the two plates 11 are then secured to one another by means of bolts or the like 25 which extend through the two halves and securely fasten them together. By properly utilizing the bolts 25, both as to position and as to number, all stress of an undesirable value and deflection of the die plates due to the tremendous extrusion pressures, can be minimized. The bolts can be placed through the die where the extrusion pressure is the greatest and also due to the design of the present die, the surface of pressure area is lessened especially as compared with a die having a fan-out lead area.

In the embodiment of the invention shown in the drawings, holes 26 are drilled into the die bodies 11 and heating elements preferably of a cartridge type are inserted into these holes 26 so as to provide the necessary heat for maintaining the plastic in workable condition in proximity to the passages and also the extrusion outlet 23. The heating element receiving holes are generally shown as extending inwardly from the extrusion end of the die but if desired could be inserted from the lateral side portions of the die body.

The lips if desired can be made adjustable so as to compensate for any undesirable flow characteristics along the length of the die, caused by inaccurate machining of the die or die lips, for example, or by wear, warpage, and the like following protracted use of the die. The adjustability could be effected by having the lips movably inserted in the die bodies so that they can be spacedly adjusted with respect to one another along their length. Adjustable bolts or the like could extend vertically through the die bodies for coaction with the lips to adjust the spacing and consequently the width of the extrusion slot along its length. A breaker plate and screen as set forth hereinbefore can be placed just ahead of the die lips but have not been included in the drawings for simplicity. Such a breaker plate and screen could be placed directly behind the die lips in the rectangular cut-out portion 21 or in any other desired manner known in the art.

Manifestly, changes and modifications in details of structure can be made without departing from the spirit and scope of the present invention as defined in the appended claims.

I claim:

1. An extrusion die for plastics comprising a body having a plastic inlet opening therein, flow channels through said body from said inlet opening, an extrusion outlet, said flow channels being closed and continuous and emanating from said inlet opening in a plurality of pairs of unbroken smoothly contoured branch channels leading to said outlet, the number of pairs uniformly increasing in number from the inlet to the outlet and each succeeding pair being a multiple of the preceding one whereby the flow distance from any point in a said channel to the outlet is substantially equal.

2. An extrusion die for plastics comprising a body, an inlet into said body, a flow channel from said inlet in said body, said flow channel being divided into a multiple of an even number of closed and continuous extending channels, a common outlet for plastic material connected with all said extending channels, the flow distance from any point in said channels to the outlet being substantially equal.

3. An extrusion die for plastics as claimed in claim 1, the cross-section of all said channels being circular and the merging areas of said channels being streamlined and of sinuous configuration.

4. An extrusion die for plastics as claimed in claim 3, the outermost end of said channels toward the extrusion outlet expanding into substantially rectangular channels and each merging with contiguous ones to form an elongated outlet opening.

5. An extrusion die for plastics as claimed in claim 4, die lips on said body connected at said outlet, said die lips having generally rounded converging cut-out portions adjacent said outlet and an elongated extrusion slot merging thereinto, said converging portions guiding plastic flowing through said channels into said outlet and forming a pressure increasing abutment.

6. An extrusion die for plastics comprising first and second superposed die bodies, each said die body having semi-circular plastic flow channels formed therein, said semi-circular channels in said first die body coacting with the channels in said second superposed body to form circular flow channels, a plastic inlet opening in said die connecting into an end of said channel, said channels emanating from a single channel into a plurality of pairs of branch channels and leading to a common outlet slot, said channels being closed and unbroken and of smooth contours, the flow distance from any point in a said channel to the outlet being substantially equal.

7. An extrusion die as claimed in claim 6, said flow channels being divided into a multiple of an even number of extending channels, said channels being streamlined and in the merging area of said channels being sinuous in configuration.

8. An extrusion die for plastics as claimed in claim 7, said superposed die bodies each having a cut-out portion at the outlet end thereof, in mating position with one another, die lips removably secured in said cut-out portion, each said die lip having an inner generally curved and decreasing depth cut-out portion and a generally flat extended portion from said curved portion, said curved cut-out portions and said generally flat portions coacting with one another to form an extrusion outlet, said channels at the point of merging with said lips being generally rectangular in shape and merging at their outer extremity to form a rectangular shaped outlet opening for coaction with said die lips.

9. In an extrusion die for plastics, flow channels through said die from a plastic inlet to an extrusion outlet, said flow channels being closed, continuous and streamlined, said channels emanating from the inlet in a plurality of increasing multiples of branch channels leading to the outlet, the flow distance from any point in a said channel to the outlet being substantially equal.

10. An extrusion die for plastics comprising a body having a plastic inlet opening therein, closed flow channels through said body from said inlet opening, an extrusion outlet, said flow channels being continuous and emanating from said inlet opening in a plurality of increasing multiples of branch channels leading to said outlet, the flow distance from any point in a said channel to the outlet being substantially equal.

11. An extrusion die for plastics as claimed in claim 10, the cross-section of said channels being smoothly contoured and non-angular, the merging areas of said channels being sinuous in configuration.

12. An extrusion die for plastics as claimed in claim 11, the outermost ends of said channels toward the extrusion outlet merging with one another to form a continuous outlet opening.

13. An extrusion die for plastics as claimed in claim 12, die lips on said body at said outlet, said die lips having smoothly contoured non-angular converging portions and an extrusion slot merging thereinto, said converging portions smoothly guiding plastic flowing through said channels into said outlet.

References Cited in the file of this patent

UNITED STATES PATENTS

| | | |
|---|---|---|
| 1,779,638 | Pilkington | Oct. 28, 1930 |
| 2,624,914 | Rhodes | Jan. 13, 1953 |

FOREIGN PATENTS

| | | |
|---|---|---|
| 138,557 | Great Britain | Feb. 12, 1920 |
| 414,535 | Great Britain | Aug. 9, 1934 |